(12) United States Patent
Wang

(10) Patent No.: US 12,069,493 B2
(45) Date of Patent: Aug. 20, 2024

(54) SIDELINK MONITORING METHOD FOR VEHICLE COMMUNICATION AND RELATED APPARATUS

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 347 days.

(21) Appl. No.: 17/461,671

(22) Filed: Aug. 30, 2021

(65) Prior Publication Data

US 2021/0392533 A1    Dec. 16, 2021

Related U.S. Application Data

(63) Continuation of application No. PCT/CN2020/094313, filed on Jun. 4, 2020.

(30) Foreign Application Priority Data

Jun. 17, 2019    (CN) .......................... 201910522086.7

(51) Int. Cl.
*H04W 24/08*    (2009.01)
*H04B 17/309*    (2015.01)
(Continued)

(52) U.S. Cl.
CPC .......... *H04W 24/08* (2013.01); *H04B 17/309* (2015.01); *H04W 4/40* (2018.02); *H04W 76/14* (2018.02)

(58) Field of Classification Search
CPC ....... H04W 24/08; H04W 4/40; H04W 76/14; H04W 76/19; H04W 76/30; H04W 76/12;
(Continued)

(56) References Cited

U.S. PATENT DOCUMENTS 9,432,860 B1    8/2016  Khanka et al.
2009/0109838 A1*  4/2009  Kuo ...................... H04W 76/18
                                                                370/216
(Continued)

FOREIGN PATENT DOCUMENTS

CN          101120532 A       2/2008
CN          101378577 A       3/2009
(Continued)

OTHER PUBLICATIONS

U.S. Appl. No. 62/799,586, filed Jan. 31, 2019, (Year: 2019).*
(Continued)

*Primary Examiner* — Ian N Moore
*Assistant Examiner* — Sun Jong Kim
(74) *Attorney, Agent, or Firm* — Morgan, Lewis & Bockius LLP

(57)    ABSTRACT

A first vehicle communication terminal establishes a unicast link with a second vehicle communication terminal. The first terminal monitors communication quality of the unicast link. The first terminal determines, according to the communication quality of the unicast link, whether the unicast link fails. In accordance with a determination that the unicast link fails and does not recover in a preset time, the first terminal releases the unicast link.

16 Claims, 5 Drawing Sheets

Vehicle communication terminal 101

Vehicle communication terminal 102

(51) Int. Cl.
*H04W 4/40* (2018.01)
*H04W 76/14* (2018.01)

(58) Field of Classification Search
CPC ....... H04W 4/46; H04W 24/10; H04W 76/18; H04W 92/18; H04B 17/309; H04B 17/346; H04B 17/347
See application file for complete search history.

(56) References Cited

U.S. PATENT DOCUMENTS

| | | | |
|---|---|---|---|
| 2011/0252144 | A1 | 10/2011 | Tung et al. |
| 2012/0051240 | A1 | 3/2012 | Dwivedi et al. |
| 2014/0335872 | A1* | 11/2014 | Yamada ............ H04W 36/0079 455/450 |
| 2019/0037430 | A1* | 1/2019 | Lee ...................... H04L 43/0882 |
| 2019/0058986 | A1* | 2/2019 | Loehr ................... H04L 1/1825 |
| 2020/0252989 | A1* | 8/2020 | Chen ...................... H04L 5/0048 |
| 2021/0127300 | A1* | 4/2021 | Cui ......................... H04L 1/187 |
| 2022/0117032 | A1* | 4/2022 | Han .......................... H04L 1/08 |

FOREIGN PATENT DOCUMENTS

| | | |
|---|---|---|
| CN | 102143522 A | 8/2011 |
| CN | 102365830 A | 2/2012 |
| CN | 103889072 A | 6/2014 |
| CN | 110177353 A | 8/2019 |
| KR | 20130009827 A | 1/2013 |

OTHER PUBLICATIONS

"Consideration on sidelink RLM management" 3GPP TSG RAN WG2 Meeting #106 Reno, USA, May 13-17, 2019 (R2-1906477) (Year: 2019).*

Extended European Search Report, EP20827105.6, Mar. 10, 2022, 11 pgs.

OPPO, "Discussion on RRM and RLM of Unicast for V2X", 3GPP TSG-RAN WG2 Meeting #105, R2-1900176, Feb. 15, 2019, Agenda Item: 11.4.2.1, XP051601576, 4 pgs.

Samsung, "Remaining Issues on SL RLM/RLF 2-12 Declaration for NR V2X Unicast", 3GPP TSG-RAN WG2 Meeting #106, R2-1907963, Agenda item: 11.4.5, May 13, 2019, XP051731370, 3 pgs.

Vivo, "Open Issues for Sidelink Link Failure and Release", 3GPP TSG-RAN WG2 Meeting #106, R2-1905845, May 13, 2019, XP051729343, 3 pgs.

ZTE Corporation, "Consideration on Sidelink RLM Management", 3GPP TSG RAN WG2 Meeting #106, R2-1906477, Agenda item: 11.4.5, May 13, 2019, XP051729942, 5 pgs.

Tencent Technology, WO, PCT/CN2020/094313, Aug. 28, 2020, 5 pgs.

Tencent Technology, IPRP, PCT/CN2020/094313, Dec. 21, 2021, 6 pgs.

LG Electronics, "Discussion on Potential Enhancements for Uu-based V2V, V2I/N, V2P," 3GPP TSG RAN WG1, Meeting #83, R1-157437, Nov. 22, 2015, 11 pgs.

Tencent Technology, ISR, PCT/CN2020/094313, Aug. 28, 2020, 4 pgs.

Tencent Technology, JP Office Action, Japanese Patent Application No. 2021-553845, Oct. 11, 2022, 7 pgs.

"3rd Generation Partnership Project; Technical Specification Group Radio Access Network; Evolved Universal Terrestrial Radio Access (E-UTRA); Radio Resource Control (RRC); Protocol specification (Release 15)", 3GPP, TS36.331 v15.6.0, 3GPP Server Release Date Jun. 16, 2019, 946 pgs.

Tencent Technology, Korean Office Action, KR Patent Application No. 10-2021-7033223, Dec. 13, 2023, 4 pgs.

* cited by examiner

SIDELINK MONITORING METHOD FOR VEHICLE COMMUNICATION AND RELATED APPARATUS

CROSS-REFERENCE TO RELATED APPLICATIONS

This application is a continuation application of PCT Patent Application No. PCT/CN2020/094313, entitled "SIDELINK MONITORING METHOD FOR VEHICLE COMMUNICATION. AND RELATED DEVICE" filed on Jun. 4, 2020, which claims priority to Chinese Patent Application No. 201910522086.7, filed with the State Intellectual Property Office of the People's Republic of China on Jun. 17, 2019, and entitled "SIDELINK MONITORING METHOD FOR VEHICLE COMMUNICATION, APPARATUS, MEDIUM, AND ELECTRONIC DEVICE", all of which are incorporated herein by reference in their entirety.

FIELD OF THE TECHNOLOGY

This application relates to the field of computer and communication technologies, and specifically, to a sidelink monitoring method for vehicle communication and a related apparatus.

BACKGROUND OF THE DISCLOSURE

Effectiveness and reliability of vehicle-to-everything (V2X) communication are inseparable from safety of automated driving. The effectiveness means that data can be transmitted timely, which may be embodied as a low latency. The reliability means a low packet loss rate of data transmission.

SUMMARY

Embodiments of this application provide a sidelink monitoring method for vehicle communication and a related apparatus, to ensure effectiveness and reliability of unicast link transmission at least to some extent, and improve utilization of wireless communication resources.

Other features and advantages of this application become obvious through the following detailed descriptions, or may be partially learned partially through the practice of this application.

According to an aspect of the embodiments of this application, a sidelink monitoring method for vehicle communication is performed by a first vehicle communication terminal. The method comprises: establishing a unicast link with a second vehicle communication terminal; monitoring communication quality of the unicast link; determining, according to the communication quality of the unicast link, whether the unicast link fails; and releasing the unicast link in accordance with a determination that the unicast link fails and does not recover in a first preset time.

According to an aspect of the embodiments of this application, a first vehicle communication terminal is provided, including: a link establishing unit, configured to establish a unicast link with a second vehicle communication terminal; a monitoring unit, configured to monitor communication quality of the unicast link, to determine, according to the communication quality of the unicast link, whether the unicast link fails; and a processing unit, configured to release the unicast link in accordance with a determination that the unicast link fails and does not recover in a first preset time.

In some embodiments of this application, based on the foregoing solutions, the monitoring unit is configured to count, through a Radio Link Control (RLC) layer, a quantity of times of failures of transmission performed based on the unicast link; and determine that the unicast link fails when the quantity of times of failures of transmission performed based on the unicast link reach a specified quantity of times.

In some embodiments of this application, based on the foregoing solutions, the monitoring unit is configured to transmit a sidelink detection signal through a Media Access Control (MAC) layer; and determine, based on a detection result for the sidelink detection signal, whether the unicast link fails.

In some embodiments of this application, based on the foregoing solutions, the monitoring unit is configured to detect, through a MAC layer, a random access-based handshake data packet transmitted by the first vehicle communication terminal according to the unicast link; and determine, based on a detection result for the handshake data packet, whether the unicast link fails.

In some embodiments of this application, based on the foregoing solutions, the monitoring unit is configured to measure, through a physical (PHY) layer, signal quality of a reference signal transmitted by the second vehicle communication terminal through the unicast link; and determine, according to the signal quality of the reference signal, whether the unicast link fails.

In some embodiments of this application, based on the foregoing solutions, the monitoring unit is further configured to continue to measure the signal quality of the reference signal in a second preset time through the PHY layer after determining that the unicast link fails, the second preset time being less than the first preset time; and determine that the PHY layer of the unicast link recovers in accordance with a determination, according to the signal quality of the reference signal in the second preset time, that the unicast link recovers.

In some embodiments of this application, based on the foregoing solutions, the monitoring unit is configured to count, through a PHY layer, reception acknowledgement information fed back by the second vehicle communication terminal, the reception acknowledgement information being transmitted by the second vehicle communication terminal according to a situation of receiving a communication message transmitted by the unicast link; determine a quantity of times of unsuccessful reception of the second vehicle communication terminal according to the counted reception acknowledgement information fed back by the second vehicle communication terminal; and determine, according to the quantity of times of unsuccessful reception of the second vehicle communication terminal, whether the unicast link fails.

In some embodiments of this application, based on the foregoing solutions, the monitoring unit is configured to monitor (e.g., determine) the communication quality of the unicast link through the PHY layer, the MAC layer, and the RLC layer respectively; and determine that the unicast link fails when at least one of the PHY layer, the MAC layer, and the RLC layer determines that the communication quality of the unicast link is abnormal.

In some embodiments of this application, based on the foregoing solutions, the monitoring unit is further configured to transmit, in the first preset time after determining that the unicast link fails, indication information to the MAC layer when the PHY layer monitors (e.g., determines) that the unicast link recovers, to trigger the MAC layer to monitor (e.g., determine) whether the unicast link recovers;

transmit the indication information to the RLC layer when the PHY layer and the MAC layer monitor that the unicast link recovers, to trigger the RLC layer to monitor whether the unicast link recovers; and determine that the unicast link recovers when the PHY layer, the MAC layer, and the RLC layer monitor that the unicast link recovers.

In some embodiments of this application, based on the foregoing solutions, the monitoring unit is further configured to obtain, in the first preset time after determining that the unicast link fails, monitoring results of the PHY layer, the MAC layer, and the RLC layer for the unicast link; and determine that the unicast link recovers when the PHY layer, the MAC layer, and the RLC layer all monitor that the unicast link recovers.

In some embodiments of this application, based on the foregoing solutions, the processing unit is further configured to pause, after determining that the unicast link fails, transmitting vehicle communication data through the unicast link, and transmit the vehicle communication data through a backup link.

In some embodiments of this application, based on the foregoing solutions, the backup link includes a first backup link or a second backup link, and the processing unit is further configured to preferentially transmit the vehicle communication data through the first backup link between the first vehicle communication terminal and an access network entity, and transmit the vehicle communication data through the second backup link between the first vehicle communication terminal and the second vehicle communication terminal when there is no first backup link.

According to an aspect of the embodiments of this application, a non-transitory computer-readable medium storage medium is provided, storing a computer program, the computer program, when executed by one or more processors, cause the one or more processors to perform any of the methods disclosed herein.

According to an aspect of the embodiments of this application, an electronic device is provided, including: one or more processors; and a storage apparatus, configured to store one or more programs, the one or more programs, when executed by the one or more processors, cause the one or more processors to perform any of the methods disclosed herein.

According to an aspect of the embodiments of this application, a computer program product including instructions is provided, the computer program product, when executed on a computer, cause the computer to perform any of the operations disclosed herein.

In technical solutions provided in some embodiments of this application, the communication quality of the unicast link established between the first vehicle communication terminal and the second vehicle communication terminal is monitored, and whether the unicast link fails is determined according to the communication quality of the unicast link, so that a dynamic monitoring mechanism can be implemented for the unicast link established between the vehicle communication terminals, and more efficient and reliable transmission can be implemented according to the communication quality of the unicast link. Meanwhile, the unicast link may be released when the unicast link fails and does not recover in a specific time, thereby improving the utilization of the wireless communication resources.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

Exemplary implementations are now described more comprehensively with reference to the accompanying drawings. However, the exemplary implementations can be implemented in various forms and are not construed as being limited to the examples herein. Conversely, such implementations are provided to make this application more comprehensive and complete, and fully convey the concepts of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of this application. However, a person skilled in the art is to be aware that, the technical solutions in this application may be implemented without one or more of the particular details, or another method, unit, apparatus, or step may be used. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
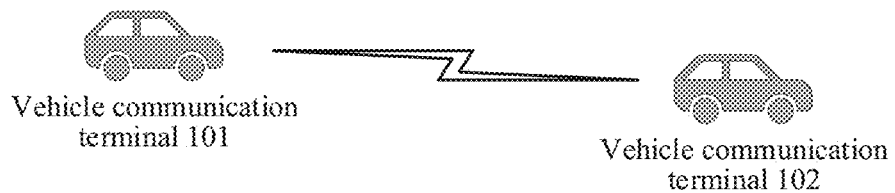
FIG. 1 is a schematic diagram of an exemplary system architecture to which a technical solution according to an embodiment of this application is applicable.

FIG. 1 is a schematic diagram of an exemplary system architecture to which a technical solution according to an embodiment of this application is applicable.

As shown in FIG. 1, the system architecture may include a vehicle communication terminal 101 and a vehicle communication terminal 102. The vehicle communication terminal 101 may establish a unicast link with the vehicle communication terminal 102, to perform vehicle communication through the unicast link.

It is to be understood that quantities of vehicle communication terminals shown in FIG. 1 are merely an example. There may be any number (e.g., quantity) of vehicle communication terminals according to an actual requirement. For example, a first vehicle communication terminal may establish a unicast link with any number of second vehicle communication terminals.

In an embodiment of this application, after the vehicle communication terminal 101 establishes a unicast link with the vehicle communication terminal 102, the vehicle communication terminal 101 or the vehicle communication terminal 102 may be used as the first vehicle communication terminal according to the embodiments of this application to monitor communication quality of the unicast link. Correspondingly, the other vehicle communication terminal is used as the second vehicle communication terminal. For example, when the vehicle communication terminal 101 is used as the first vehicle communication terminal, the vehicle communication terminal 102 is used as the second vehicle communication terminal, or, when the vehicle communication terminal 102 is used as the first vehicle communication terminal, the vehicle communication terminal 101 is used as the second vehicle communication terminal.

The first vehicle communication terminal determines, according to the communication quality of the unicast link, whether the unicast link fails. If it is determined that the unicast link fails and does not recover in a first preset time, the unicast link may be released, so that a new unicast link is established between the vehicle communication terminal 101 and the vehicle communication terminal 102. It may be seen that in the technical solution provided in this embodiment of this application, a dynamic monitoring mechanism can be implemented for the unicast link established between the vehicle communication terminals, and more efficient and reliable transmission can be implemented according to the communication quality of the unicast link; and the unicast link that fails may be released, thereby improving utilization of wireless communication resources.

The sidelink monitoring method for vehicle communication provided in the embodiments of this application is performed by the first vehicle communication terminal (the vehicle communication terminal 101 or the vehicle communication terminal 102 shown in FIG. 1).

The implementation details of the technical solution of this embodiment of this application are described in detail in the following.

Figure 2:
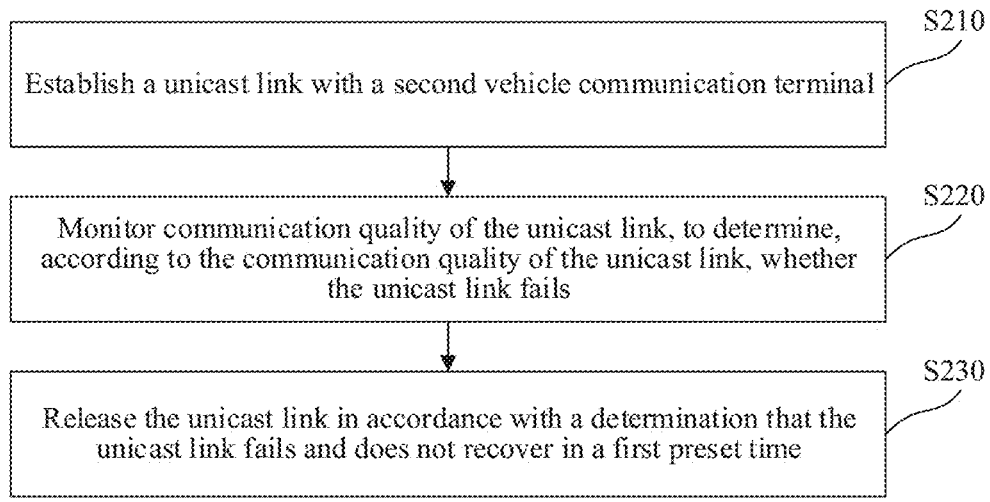
FIG. 2 is a flowchart of a sidelink monitoring method for vehicle communication according to an embodiment of this application.

FIG. 2 is a flowchart of a sidelink monitoring method for vehicle communication according to an embodiment of this application. The sidelink monitoring method for vehicle communication may be performed by a first vehicle communication terminal. Referring to FIG. 2, the sidelink monitoring method for vehicle communication includes at least S210 to S230. A detailed description is as follows.

S210. Establish a unicast link with a second vehicle communication terminal.

In an embodiment of this application, a unicast link established between vehicle communication terminals (for example, between the first vehicle communication terminal and the second vehicle communication terminal) may correspond to identification information of the two vehicle communication terminals or correspond to address information of the two vehicle communication terminals. Certainly, the unicast link established between the vehicle communication terminals may also correspond to a V2X application program run on the two vehicle communication terminals, or correspond to a plurality of pairs of V2X application programs run on the two vehicle communication terminals and having the same quality of service (QoS) requirements.

The unicast link established between the two vehicle communication terminals may be used as a sidelink between the two vehicle communication terminals, that is, a link to be monitored in this embodiment of this application.

Still refer to FIG. 2. S220. Monitor communication quality of the unicast link, to determine, according to the communication quality of the unicast link, whether the unicast link fails.

Figure 3:
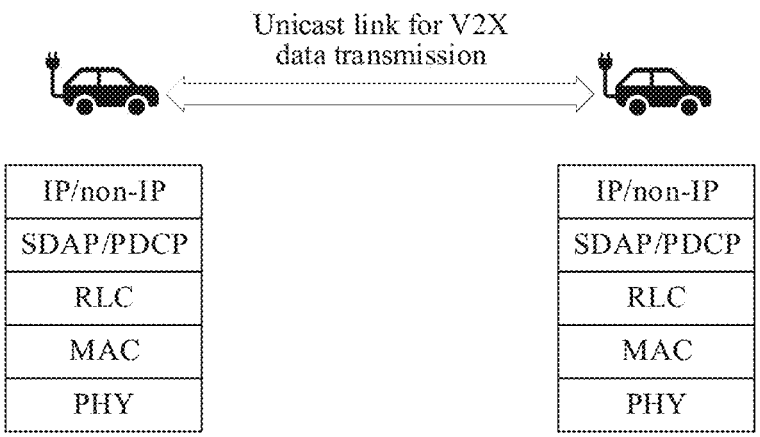
FIG. 3 is a schematic diagram of protocol layers of a unicast link that is used for V2X data transmission and that is established by two vehicle communication terminals according to an embodiment of this application.

In an embodiment of this application, as shown in FIG. 3, a unicast link established between two vehicle communication terminals and used for V2X data transmission may be carried on the following protocol layers: an Internet Protocol (IP)/non-IP layer, a Service Data Adaptation Protocol (SDAP)/Packet Data Convergence Protocol (PDCP) layer, an RLC layer, a MAC layer, and a PHY layer.

Figure 4:
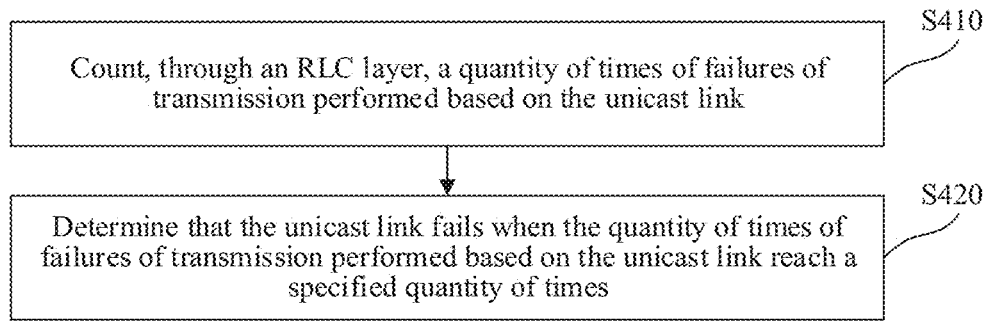
FIG. 4 is a flowchart of determining whether a unicast link fails according to an embodiment of this application.

In an embodiment of this application, whether the unicast link fails may be monitored through the RLC layer, the MAC layer, and the PHY layer respectively. A detailed description is as follows:

In an embodiment of this application, as shown in FIG. 4, a process in S220 of monitoring communication quality of the unicast link, to determine, according to the communication quality of the unicast link, whether the unicast link fails may include the following steps:

S410. Count, through an RLC layer, a number (e.g., quantity) of times of failures of transmission performed based on the unicast link.

In an embodiment of this application, if an acknowledged mode (AM) is used on the RLC layer, whether the transmission performed based on the unicast link fails may be determined according to received acknowledgement information. If the transmission fails, the quantity of times of failures of transmission may be counted. In some circumstances, the failure of transmission performed based on the unicast link may alternatively be a failure of data transmission.

S420. Determine that the unicast link fails when the quantity of times of failures of transmission performed based on the unicast link reach a specified quantity of times.

In the technical solution of the embodiment shown in FIG. 4, the unicast link of vehicle communication can be monitored through the RLC layer, and more efficient and reliable transmission is implemented according to the communication quality of the unicast link.

Figure 5:
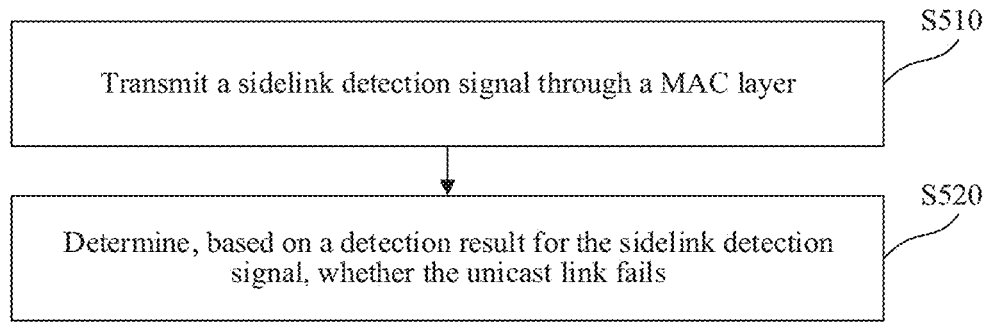
FIG. 5 is a flowchart of determining whether a unicast link fails according to an embodiment of this application.

In an embodiment of this application, as shown in FIG. 5, a process in S220 of monitoring communication quality of the unicast link, to determine, according to the communication quality of the unicast link, whether the unicast link fails may include the following steps:

S510. Transmit a sidelink detection signal through a MAC layer.

S520. Determine, based on a detection result for the sidelink detection signal, whether the unicast link fails.

In an embodiment of this application, the MAC layer may transmit the sidelink detection signal before the first vehicle communication terminal transmits vehicle communication data such as a vehicle communication message, to determine, according to the detection result for the sidelink detection signal, whether the unicast link fails. For example, whether the unicast link fails may be determined according to a situation in which a receiving end receives the sidelink detection signal, that is, if the receiving end successfully receives the sidelink detection signal for many times or quality of the received detection signal is relatively high, it indicates that the unicast link is normal, otherwise, it indicates that the unicast link fails.

In the technical solution of the embodiment shown in FIG. 5, the unicast link of vehicle communication can be monitored through the MAC layer, and more efficient and reliable transmission is implemented according to the communication quality of the unicast link.

Figure 6:
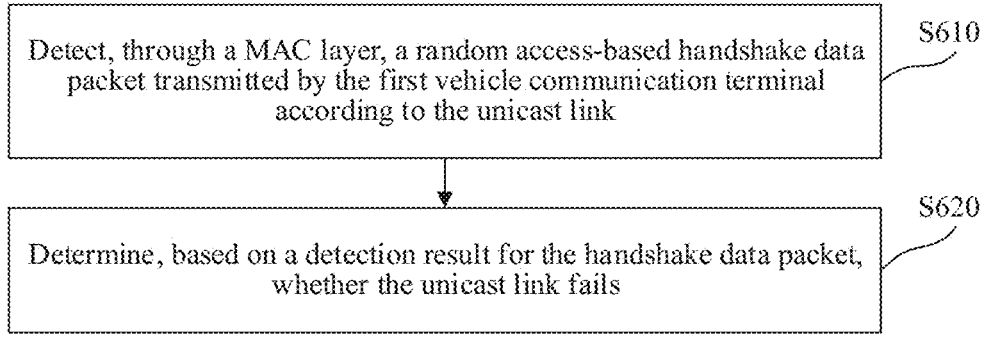
FIG. 6 is a flowchart of determining whether a unicast link fails according to an embodiment of this application.

In an embodiment of this application, as shown in FIG. 6, a process in S220 of monitoring communication quality of the unicast link, to determine, according to the communication quality of the unicast link, whether the unicast link fails may include the following steps:

S610. Detect, through a MAC layer, a random access-based handshake data packet transmitted by the first vehicle communication terminal according to the unicast link.

S620. Determine, based on a detection result for the handshake data packet, whether the unicast link fails. For example, if the handshake data packet is detected, it may be determined that the unicast link is normal.

In the technical solution of the embodiment shown in FIG. 6, the unicast link of vehicle communication can be monitored through the MAC layer, and more efficient and reliable transmission is implemented according to the communication quality of the unicast link.

Figure 7:
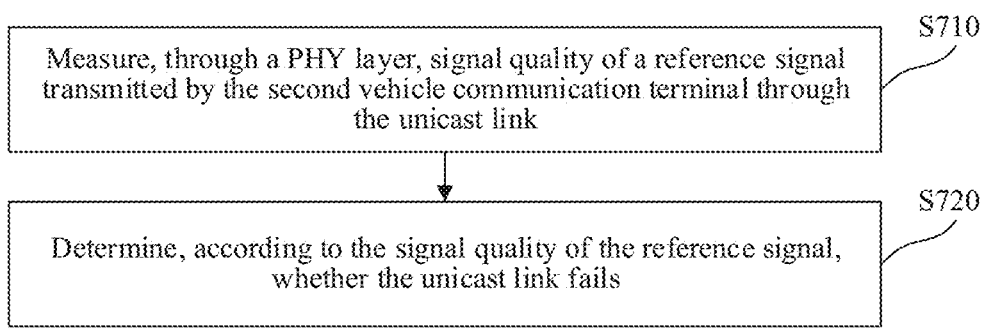
FIG. 7 is a flowchart of determining whether a unicast link fails according to an embodiment of this application.

In an embodiment of this application, as shown in FIG. 7, a process in S220 of monitoring communication quality of the unicast link, to determine, according to the communication quality of the unicast link, whether the unicast link fails may include the following steps:

S710. Measure, through a PHY layer, signal quality of a reference signal transmitted by the second vehicle communication terminal through the unicast link.

S720. Determine, according to the signal quality of the reference signal, whether the unicast link fails.

In an embodiment of this application, if the signal quality of the measured reference signal is relatively high, it may be determined that the unicast link is normal; otherwise, if the signal quality of the measured reference signal is relatively poor, it may be determined that the unicast link fails.

In the technical solution of the embodiment shown in FIG. 7, the unicast link of vehicle communication can be monitored through the PHY layer, and more efficient and reliable transmission is implemented according to the communication quality of the unicast link.

Based on the technical solution of the embodiment shown in FIG. 7, the signal quality of the reference signal may continue to be measured in a second preset time through the PHY layer after determining that the unicast link fails. The second preset time is less than the first preset time (e.g., has a shorter length of time, shorter time duration, etc.). If it is determined, according to the signal quality of the measured reference signal in the second preset time, that the unicast link recovers, it may be determined that the PHY layer of the unicast link recovers.

Figure 8:
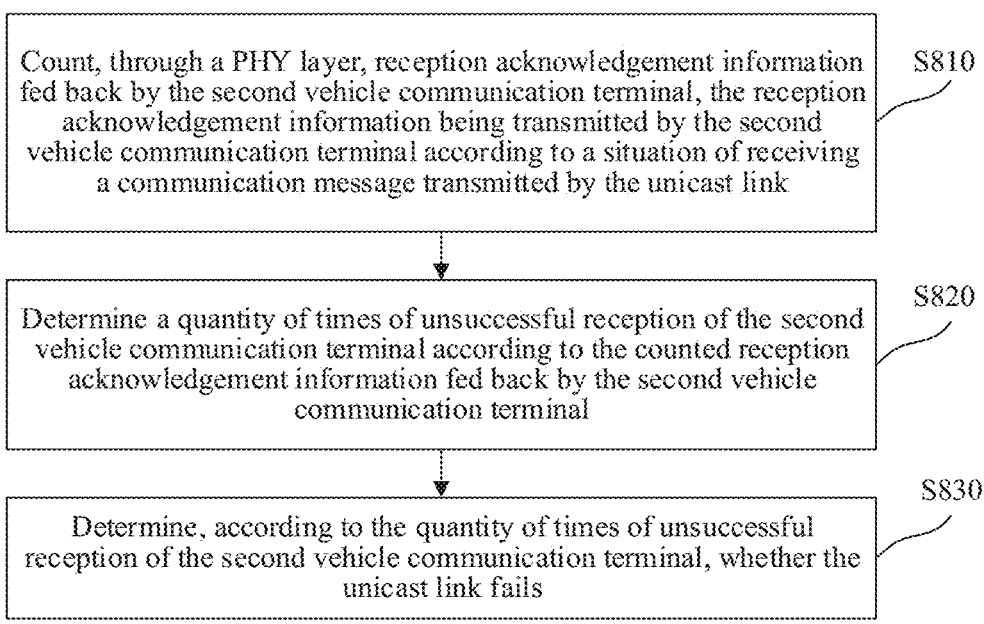
FIG. 8 is a flowchart of determining whether a unicast link fails according to an embodiment of this application.

In an embodiment of this application, as shown in FIG. 8, a process in S220 of monitoring communication quality of the unicast link, to determine, according to the communication quality of the unicast link, whether the unicast link fails may include the following steps:

S810. Count, through a PHY layer, reception acknowledgement information fed back by the second vehicle communication terminal, the reception acknowledgement information being transmitted by the second vehicle communication terminal according to a situation of receiving a communication message transmitted by the unicast link.

In an embodiment of this application, after the first vehicle communication terminal transmits the vehicle communication data through the unicast link, the second vehicle communication terminal may return the reception acknowledgement information according to the situation of receiving the vehicle communication data, and the reception acknowledgement information fed back by the second vehicle communication terminal may be counted.

S820. Determine a quantity of times of unsuccessful reception of the second vehicle communication terminal according to the reception acknowledgement information.

In an embodiment of this application, the reception acknowledgement information fed back by the second vehicle communication terminal includes information about successful reception and information about unsuccessful reception. Therefore, the quantity of times of unsuccessful reception of the second vehicle communication terminal may be determined according to the counted reception acknowledgement information fed back by the second vehicle communication terminal.

S830. Determine, according to the quantity of times of unsuccessful reception, whether the unicast link fails.

In an embodiment of this application, if the quantity of times of unsuccessful reception of the second vehicle communication terminal reach a specified quantity of times, it may be determined that the unicast link fails.

In the technical solution of the embodiment shown in FIG. 8, the unicast link of vehicle communication can be monitored through the PHY layer, and more efficient and reliable transmission is implemented according to the communication quality of the unicast link.

Figure 9:
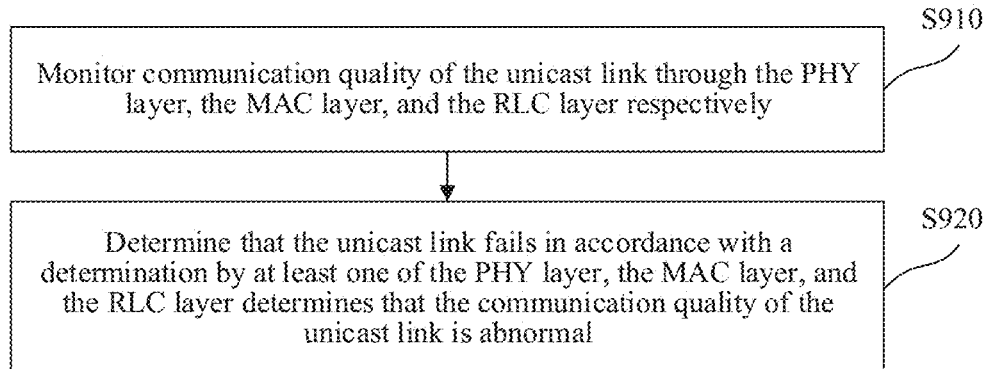
FIG. 9 is a flowchart of determining whether a unicast link fails according to an embodiment of this application.

In an embodiment of this application, as shown in FIG. 9, a process in S220 of monitoring communication quality of the unicast link, to determine, according to the communication quality of the unicast link, whether the unicast link fails may include the following steps:

S910. Monitor the communication quality of the unicast link through the PHY layer, the MAC layer, and the RLC layer respectively.

In an embodiment of this application, for a process of monitoring the communication quality of the unicast link through the PHY layer, the MAC layer, and the RLC layer respectively, reference may be made to the technical solutions of the foregoing embodiments, and details are not described herein again.

S920. Determine that the unicast link fails when at least one of the PHY layer, the MAC layer, and the RLC layer determines that the communication quality of the unicast link is abnormal.

Figure 10:
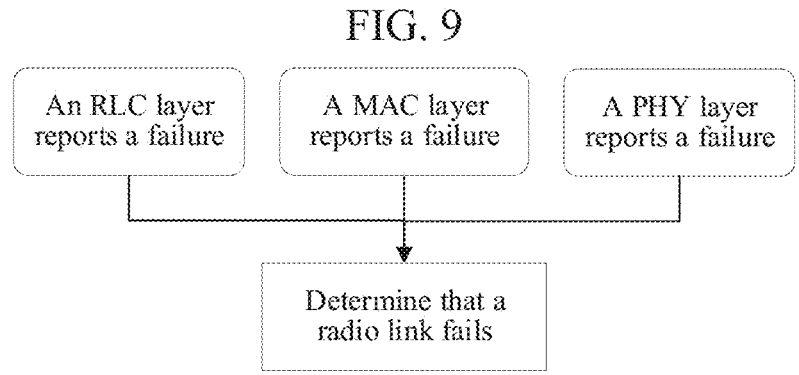
FIG. 10 is a flowchart of determining, according to monitoring reports of an RLC layer, a MAC layer, and a PHY layer, whether a unicast link fails according to an embodiment of this application.

In an embodiment of this application, as shown in FIG. 10, whether communication quality of a radio link is abnormal may be determined according to a report of a failure monitored by the RLC layer, a report of a failure monitored by the MAC layer, and a report of a failure monitored by the PHY layer. For example, a connection management function module may be set, and the report of the failure monitored by the RLC layer, the report of the failure monitored by the MAC layer, and the report of the failure monitored by the PHY layer are all reported to the connection management function module. If any layer monitors that the communication quality is abnormal (for example, a link failure is identified), it may be determined that the radio link fails. In this case, if it is determined that the unicast link fails, monitoring results of the PHY layer, the MAC layer, and the RLC layer for the unicast link may further continue to be obtained. When the PHY layer, the MAC layer, and the RLC layer all monitor that the unicast link recovers, it may be determined that the unicast link recovers.

In an embodiment of this application, the monitoring results for the communication quality of the unicast link may be further reported by the PHY layer, the MAC layer, and the RLC layer one by one. Specifically, for example, the monitoring result for the unicast link may be reported by the PHY layer to the MAC layer, and the monitoring result for the unicast link may be reported by the MAC layer to the RLC layer. In this case, if it is determined that the unicast link fails, and the PHY layer monitors that the unicast link recovers, indication information is transmitted to the MAC layer, to trigger the MAC layer to monitor whether the unicast link recovers. If the PHY layer and the MAC layer monitor that the unicast link recovers, the indication information is transmitted to the RLC layer, to trigger the RLC layer to monitor whether the unicast link recovers. If the PHY layer, the MAC layer, and the RLC layer monitor that the unicast link recovers, it is determined that the unicast link recovers.

That is, in this embodiment of this application, if a specific layer monitors that the unicast link fails, a failure indication may be generated, and if the specific layer monitors that the unicast link recovers, the failure indication may be canceled. In addition, if a next layer monitors that the unicast link recovers, indication information may be transmitted to a previous layer, and detection on the unicast link may be triggered by the previous layer. For example, if the PHY layer monitors that the unicast link fails, indication information may be transmitted to the MAC layer, to trigger the MAC layer to detect whether the unicast link fails. Compared with a detection manner of a fixed period (that is, a manner of detecting, at regular intervals after determining that the unicast link fails, whether the unicast link recovers), such a detection manner can improve efficiency of monitoring a failure. Certainly, in other embodiments of this application, the detection manner through triggering and the detection manner of a fixed period may be further combined, that is, if a specific layer receives indication information from a next layer, but a fixed period has not arrived, detection on a unicast link may be triggered. If the specific layer has not received the indication information from the next layer, but the fixed period has arrived, detection on the unicast link may also be triggered.

Still refer to FIG. 2. S230. Release the unicast link in accordance with a determination that the unicast link fails and does not recover in a first preset time.

In an embodiment of this application, if the unicast link is monitored through the PHY layer, the MAC layer, and the RLC layer, when the PHY layer, the MAC layer, and the RLC layer all monitor that the unicast link is normal, it is determined that the unicast link recovers. After the unicast link is released, the first vehicle communication terminal may establish a new unicast sidelink connection with the surrounding second vehicle communication terminal.

In an embodiment of this application, after it is determined that the unicast link fails, transmission of the vehicle communication data through the unicast link may be paused, and the vehicle communication data is transmitted through a backup link (including a first backup link or a second backup link in the following).

In an embodiment of this application, the transmitting the vehicle communication data through the backup link may be preferentially transmitting the vehicle communication data through the first backup link between the first vehicle communication terminal and an access network entity, and transmitting the vehicle communication data through the second backup link between the first vehicle communication terminal and the second vehicle communication terminal when there is no first backup link. The first backup link between the first vehicle communication terminal and the access network entity may be a Uu backup link, and the second backup link between the first vehicle communication terminal and the second vehicle communication terminal may be a PC5 backup link.

In the technical solution of this embodiment of this application, for example, a vehicle communication solution in a 5G system, when the sidelink supports the unicast link, dynamic monitoring can be implemented for the unicast link during vehicle communication, thereby implementing more efficient and reliable transmission according to the communication quality of the unicast link, and improving utilization of wireless communication resources.

The following describes apparatus embodiments of this application, and the apparatus embodiments may be used for performing the sidelink monitoring method for vehicle communication in the foregoing embodiment of this application. For details not disclosed in the apparatus embodiments of this application, reference may be made to the foregoing embodiments of the sidelink monitoring method for vehicle communication in this application.

Figure 11:
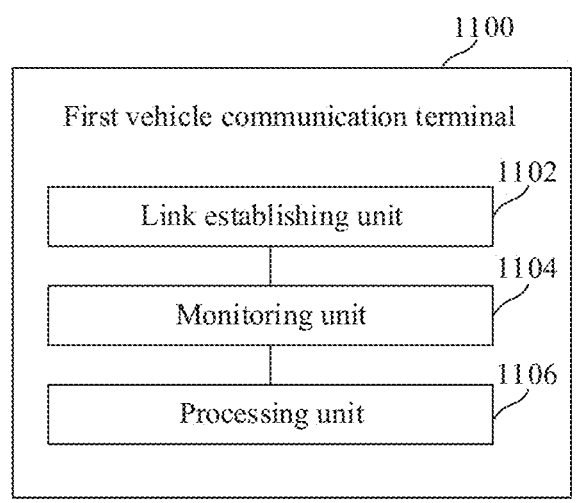
FIG. 11 is a block diagram of a first vehicle communication terminal according to an embodiment of this application.

FIG. 11 is a block diagram of a first vehicle communication terminal according to an embodiment of this application.

Referring to FIG. 11, a first vehicle communication terminal 1100 according to an embodiment of this application includes: a link establishing unit 1102, a monitoring unit 1104, and a processing unit 1106.

The link establishing unit 1102 is configured to establish a unicast link with a second vehicle communication terminal. The monitoring unit 1104 is configured to monitor communication quality of the unicast link, to determine, according to the communication quality of the unicast link, whether the unicast link fails. The processing unit 1106 is configured to release the unicast link in accordance with a determination that the unicast link fails and does not recover in a first preset time.

In some embodiments of this application, the monitoring unit 1104 is configured to count, through an RLC layer, a quantity of times of failures of transmission performed based on the unicast link; and determine that the unicast link fails when the quantity of times of failures of transmission performed based on the unicast link reach a specified quantity of times.

In some embodiments of this application, the monitoring unit 1104 is configured to transmit a sidelink detection signal through a MAC layer; and determine, based on a detection result for the sidelink detection signal, whether the unicast link fails.

In some embodiments of this application, the monitoring unit 1104 is configured to detect, through a MAC layer, a random access-based handshake data packet transmitted by the first vehicle communication terminal according to the unicast link; and determine, based on a detection result for the handshake data packet, whether the unicast link fails.

In some embodiments of this application, the monitoring unit 1104 is configured to measure, through a PHY layer, signal quality of a reference signal transmitted by the second vehicle communication terminal through the unicast link; and determine, according to the signal quality of the reference signal, whether the unicast link fails.

In some embodiments of this application, the monitoring unit 1104 is further configured to continue to measure the signal quality of the reference signal in a second preset time through the PHY layer after determining that the unicast link fails, the second preset time being less than (e.g., has a shorter duration) the first preset time; and determine that the PHY layer of the unicast link recovers in accordance with a determination, according to the signal quality of the reference signal in the second preset time, that the unicast link recovers.

In some embodiments of this application, the monitoring unit 1104 is configured to count, through a PHY layer, reception acknowledgement information fed back by the second vehicle communication terminal, the reception acknowledgement information being transmitted by the second vehicle communication terminal according to a situation of receiving a communication message transmitted by the unicast link; determine a quantity of times of unsuccessful reception of the second vehicle communication terminal according to the counted reception acknowledgement information fed back by the second vehicle communication terminal; and determine, according to the quantity of times of unsuccessful reception of the second vehicle communication terminal, whether the unicast link fails.

In some embodiments of this application, the monitoring unit 1104 is configured to monitor the communication quality of the unicast link through the PHY layer, the MAC layer, and the RLC layer respectively; and determine that the unicast link fails when at least one of the PHY layer, the MAC layer, and the RLC layer determines that the communication quality of the unicast link is abnormal.

In some embodiments of this application, the monitoring unit 1104 is further configured to transmit, in the first preset time after determining that the unicast link fails, indication information to the MAC layer when the PHY layer monitors that the unicast link recovers, to trigger the MAC layer to monitor whether the unicast link recovers; transmit the indication information to the RLC layer when the PHY layer and the MAC layer monitor that the unicast link recovers, to trigger the RLC layer to monitor whether the unicast link recovers; and determine that the unicast link recovers when the PHY layer, the MAC layer, and the RLC layer monitor that the unicast link recovers.

In some embodiments of this application, the monitoring unit 1104 is further configured to obtain, in the first preset time after determining that the unicast link fails, monitoring results of the PHY layer, the MAC layer, and the RLC layer for the unicast link; and determine that the unicast link recovers when the PHY layer, the MAC layer, and the RLC layer all monitor that the unicast link recovers.

In some embodiments of this application, the processing unit 1106 is further configured to pause, after determining that the unicast link fails, transmitting vehicle communication data through the unicast link, and transmit the vehicle communication data through a backup link.

In some embodiments of this application, the processing unit 1106 is further configured to preferentially transmit the vehicle communication data through the first backup link between the first vehicle communication terminal and an access network entity, and transmit the vehicle communication data through the second backup link between the first vehicle communication terminal and the second vehicle communication terminal when there is no first backup link.

Figure 12:
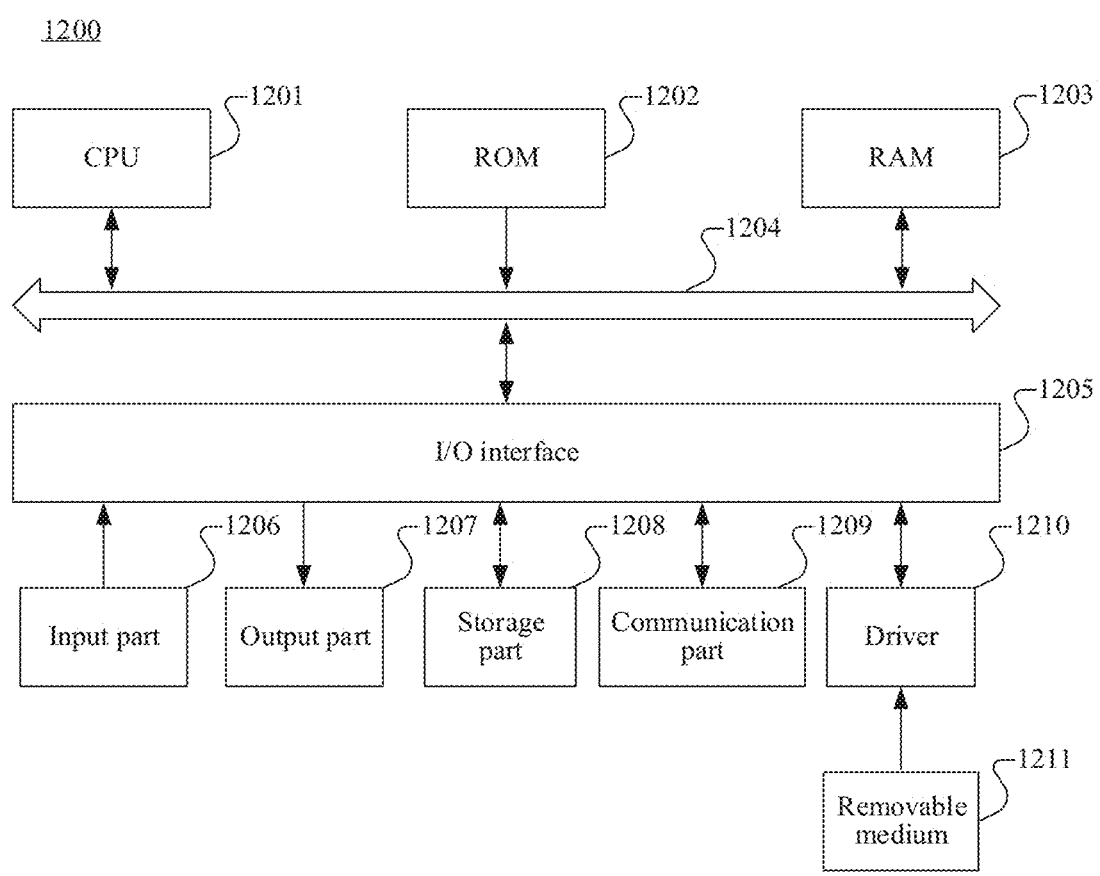
FIG. 12 is a schematic structural diagram of a computer system adapted to implement an electronic device according to an embodiment of this application.

FIG. 12 is a schematic structural diagram of a computer system adapted to implement an electronic device according to an embodiment of this application.

The computer system 1200 of the electronic device shown in FIG. 12 is merely an example, and does not constitute any limitation on functions and use ranges of the embodiments of this application.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, for example, perform the method described in the foregoing embodiments. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like, an output part 1207 including a cathode ray tube (CRT), a liquid crystal display (LCD), a speaker, or the like, a storage part 1208 including a hard disk, or the like, and a communication part 1209 including a network interface card such as a local area network (LAN) card or a modem. The communication part 1209 performs communication processing by using a network such as the Internet. A driver 1210 is also connected to the I/O interface 1205 as required. A removable medium 1211, such as a magnetic disk, an optical disc, a magneto-optical disk, or a semiconductor memory, is installed on the driver 1210 as required, so that a computer program read from the removable medium is installed into the storage part 1208 as required.

Particularly, according to an embodiment of this application, the processes described in the following by referring to the flowcharts may be implemented as computer software programs. For example, an embodiment of this application includes a computer program product. The computer program product includes a computer program stored in a non-transitory computer-readable storage medium. The computer program includes a computer program used for performing a method shown in the flowchart. In such an embodiment, the computer program may be downloaded and installed from the network through the communication portion 1209, and/or installed from the removable medium 1211. When the computer program is executed by the CPU 1201, the various functions defined in the system of this application are executed.

The non-transitory computer-readable storage medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

According to another aspect, this application further provides a non-transitory computer-readable storage medium. The computer-readable storage medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this application may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this application.

After considering the specification and practicing the disclosed implementations, a person skilled in the art may easily conceive of other implementations of this application. This application is intended to cover any variations, uses, or adaptive changes of this application following the general principles of this application, and includes well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims.

In addition, an embodiment of this application further provides a storage medium, the storage medium being configured to store a computer program, the computer program being configured to perform the method according to the foregoing embodiments.

An embodiment of this application further provides a computer program product including instructions, the computer program product, when run on a computer, causing the computer to perform the method according to the foregoing embodiments.

The embodiments in this specification are all described in a progressive manner. Description of each of the embodiments focuses on differences from other embodiments, and reference may be made to each other for the same or similar parts among the embodiments. The apparatus embodiments basically correspond to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In combination with the embodiments disclosed herein, steps of the method or algorithm described may be directly implemented by using hardware, a software module executed by a processor, or the combination thereof. The software module may be placed in a RAM, a memory, a ROM, an electrically programmable ROM (EPROM), an electrically erasable programmable ROM (EEPROM), a register, a hard disk, a removable magnetic disk, a CD-ROM, or any storage medium of other forms well-known in the technical field.

The foregoing description of the disclosed embodiments enables a person skilled in the art to implement or use this application. Various modifications to the embodiments are obvious to the person skilled in the art, and general principles defined in this specification may be implemented in other embodiments without departing from the spirit or scope of this application. Therefore, the display application is not limited to, these embodiments illustrated in the display disclosure, but needs to conform to the broadest scope consistent with the principles and novel features disclosed in the display disclosure.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs link establishing and/or monitoring. In practical application, the foregoing functions may be allocated to and completed by different functional modules according to requirements, that is, an inner structure of a device is divided into different functional modules to implement all or a part of the functions described above.

What is claimed is:

1. A sidelink monitoring method for vehicle communication, performed by a first vehicle communication terminal comprising a physical (PHY) layer and a Media Access Control (MAC) layer, the method comprising:

establishing a unicast link with a second vehicle communication terminal;
monitoring communication quality of the unicast link including:
measuring, through the PHY layer, a signal quality of a reference signal transmitted by the second vehicle communication terminal through the unicast link; and
determining, according to the signal quality of the reference signal, whether the unicast link fails;
determining that the unicast link fails based on the monitoring;
continuing to measure, in a second preset time after determining that the unicast link fails, the signal quality of the reference signal through the PHY layer, the second preset time having a shorter duration than a first preset time and being a portion of the first preset time;
after determining that the unicast link fails, in accordance with a determination that the PHY layer of the unicast link recovers based on the signal quality of the reference signal in the second preset time, transmitting indication information to the MAC layer, to trigger the MAC layer to monitor whether the MAC layer of the unicast link recovers; and
after determining that the unicast link fails, in accordance with a determination that the unicast link fails and the PHY layer of the unicast link and the MAC layer of the unicast link do not both recover within the first preset time, releasing the unicast link.

2. The method according to claim 1, wherein monitoring the communication quality of the unicast link comprises:
counting, through a Radio Link Control (RLC) layer of the first vehicle communication terminal, a quantity of times of failures of transmission performed based on the unicast link; and
in accordance with a determination that the quantity of times of failures of transmission performed based on the unicast link reach a specified quantity of times, determining that the unicast link fails.

3. The method according to claim 1, wherein monitoring the communication quality of the unicast link comprises:
transmitting a sidelink detection signal through the MAC layer; and
determining, based on a detection result for transmitting the sidelink detection signal, whether the unicast link fails.

4. The method according to claim 1, wherein monitoring the communication quality of the unicast link comprises:
detecting, through the MAC layer, a result for a transmission of a random access-based handshake data packet transmitted by the first vehicle communication terminal according to the unicast link; and
determining, based on the detected result for the transmission of the handshake data packet, whether the unicast link fails.

5. The method according to claim 1, wherein monitoring the communication quality of the unicast link comprises:
counting, through the PHY layer, reception acknowledgement information fed back by the second vehicle communication terminal, the reception acknowledgement information being transmitted by the second vehicle communication terminal according to a situation of receiving a communication message transmitted by the unicast link;
determining a quantity of times of unsuccessful reception of the second vehicle communication terminal according to the reception acknowledgement information; and determining, according to the quantity of times of unsuccessful reception, whether the unicast link fails.

6. The method according to claim 1, wherein monitoring the communication quality of the unicast link comprises:
  monitoring the communication quality of the unicast link through the PHY layer, the MAC layer, and a RLC layer, respectively; and
  in accordance with a determination by at least one of the PHY layer, the MAC layer, and the RLC layer that the communication quality of the unicast link is abnormal, determining that the unicast link fails.

7. The method according to claim 6, further comprising:
  after the determining that the unicast link fails in the first preset time:
    obtaining monitoring results of the PHY layer, the MAC layer, and the RLC layer for the unicast link; and
    in accordance with a determination by the PHY layer, the MAC layer, and the RLC layer that the unicast link recovers in the second preset time, determining that the unicast link recovers.

8. The method according to claim 1, further comprising:
  after determining that the unicast link fails, pausing transmitting vehicle communication data through the unicast link, and transmitting the vehicle communication data through a backup link.

9. The method according to claim 8, wherein the backup link comprises a first backup link or a second backup link, and the transmitting the vehicle communication data through a backup link comprises:
  transmitting the vehicle communication data through the first backup link between the first vehicle communication terminal and an access network entity when the backup link comprises the first backup link, and
  transmitting the vehicle communication data through the second backup link between the first vehicle communication terminal and the second vehicle communication terminal when the backup link comprises the second backup link but not the first backup link.

10. A first vehicle communication terminal comprising a physical (PHY) layer and a Media Access Control (MAC) layer, comprising:
  one or more processors; and
  memory storing one or more programs, that, when executed by the one or more processors, cause the one or more processors to perform operations comprising:
    establishing a unicast link with a second vehicle communication terminal;
    monitoring communication quality of the unicast link including:
      measuring, through the PHY layer, a signal quality of a reference signal transmitted by the second vehicle communication terminal through the unicast link; and
      determining, according to the signal quality of the reference signal, whether the unicast link fails;
    determining that the unicast link fails based on the monitoring;
    continuing to measure, in a second preset time after determining that the unicast link fails, the signal quality of the reference signal in a second preset time through the PHY layer, the second preset time having a shorter duration than a first preset time and being a portion of the first preset time;
    after determining that the unicast link fails, in accordance with a determination that the PHY layer of the unicast link recovers based on the signal quality of the reference signal in the second preset time, transmitting indication information to the MAC layer, to trigger the MAC layer to monitor whether the MAC layer of the unicast link recovers; and
    after determining that the unicast link fails, in accordance with a determination that the unicast link fails and the PHY layer of the unicast link and the MAC layer of the unicast link do not both recover within the first preset time, releasing the unicast link.

11. The first vehicle communication terminal according to claim 10, wherein monitoring the communication quality of the unicast link comprises:
  counting, through a Radio Link Control (RLC) layer of the first vehicle communication terminal, a quantity of times of failures of transmission performed based on the unicast link; and
  in accordance with a determination that the quantity of times of failures of transmission performed based on the unicast link reach a specified quantity of times, determining that the unicast link fails.

12. The first vehicle communication terminal according to claim 10, wherein monitoring the communication quality of the unicast link comprises:
  transmitting a sidelink detection signal through the MAC layer; and
  determining, based on a detection result for transmitting the sidelink detection signal, whether the unicast link fails.

13. The first vehicle communication terminal according to claim 10, wherein monitoring the communication quality of the unicast link comprises:
  detecting, through the MAC layer, a result for a transmission of a random access-based handshake data packet transmitted by the first vehicle communication terminal according to the unicast link; and
  determining, based on the detected result for the transmission of the handshake data packet, whether the unicast link fails.

14. A non-transitory computer-readable storage medium storing instructions that, when executed by one or more processors of a first vehicle communication terminal comprising a physical (PHY) layer and a Media Access Control (MAC) layer, cause the one or more processors to perform operations comprising:
  establishing a unicast link with a second vehicle communication terminal;
  monitoring communication quality of the unicast link comprising:
    measuring, through the PHY layer, a signal quality of a reference signal transmitted by the second vehicle communication terminal through the unicast link; and
    determining, according to the signal quality of the reference signal, whether the unicast link fails;
  determining that the unicast link fails based on the monitoring;
  continuing to measure, in a second preset time after determining that the unicast link fails, the signal quality of the reference signal through the PHY layer, the second preset time having a shorter duration than a first preset time and being a portion of the first preset time;
  after determining that the unicast link fails, in accordance with a determination that the PHY layer of the unicast link recovers based on the signal quality of the reference signal in the second preset time, transmitting indication information to the MAC layer, to trigger the MAC layer to monitor whether the MAC layer of the unicast link recovers; and after determining that the unicast link fails, in accordance with a determination that the unicast link fails and the PHY layer of the unicast link and the MAC layer of the unicast link do not both recover within the first preset time, releasing the unicast link.

15. The non-transitory computer-readable storage medium according to claim 14, wherein monitoring the communication quality of the unicast link comprises:

counting, through a Radio Link Control (RLC) layer of the first vehicle communication terminal, a quantity of times of failures of transmission performed based on the unicast link; and in accordance with a determination that the quantity of times of failures of transmission performed based on the unicast link reach a specified quantity of times, determining that the unicast link fails.

16. The non-transitory computer-readable storage medium according to claim 14, wherein monitoring the communication quality of the unicast link comprises:

transmitting a sidelink detection signal through the MAC layer; and determining, based on a detection result for transmitting the sidelink detection signal, whether the unicast link fails.

* * * * *